Patented Apr. 29, 1930

1,756,189

UNITED STATES PATENT OFFICE

JOSEPH FOUSEK, OF SAN FRANCISCO, CALIFORNIA

METHOD OF PRESERVING EGGS AND THE YOLKS AND WHITES THEREOF

No Drawing. Original application filed May 11, 1927, Serial No. 190,655. Divided and this application filed March 5, 1929. Serial No. 344,599.

The present invention relates to improvements in processes for the preservation of eggs, whether as a whole exclusive of the shells, or the whites or yolks taken separately, and is equally applicable to those freshly laid, the cold storage, or those frozen in sealed containers and kept in cold storage for future use, and is a divided out application of my co-pending application Serial No. 190,655, filed May the 11th, 1927.

The primary object of my invention is to preserve eggs in such manner and form as to cause them to retain unimpaired and indefinitely that flavor and those qualities and properties so essential to excellency of results when employed in the culinary art.

A further object of the invention is the production of a product of the character mentioned that will provide the baker and housewife with a prepared and properly proportioned egg and sugar mixture possessed of assured keeping qualities and freed from all possibility of deterioration, whatever the conditions to which it may be exposed.

Additional to the foregoing is that of improving upon the process described in my patent, No. 1,597,186, issued August the 24th, 1926.

It is a very well known practice in the egg industry for their preservation, after removal from the shell, to incorporate therewith sugar in varying quantities and thereafter either "freezing below the temperature of decomposition," or reducing the composition to a "dried and granulated form," neither of which tend, as has been determined in practice, to cause the composition to retain either the egg flavor or its baking qualities and properties, nor has dehydration been found to be any more satisfactory, as, in time, deterioration from partial decomposition results to a degree sufficient to greatly impair the quality of the dehydrated product.

In applying the term "egg" it is the intent that it include the whole egg exclusive of the shell, the separated yolk, or the separated white, and, in the matter of "sugar," that it include any saccharine substance used as a sweetener.

In the preparation of my composition, the eggs and sugar are combined in equal quantities, by weight, whatever their source or character, and the mass raised to a temperature somewhat below that required for the coagulation of albumen, or from 40 to 60 degrees Reaumur, the while undergoing a thorough mixing by mechanical means for the proper agglutination and incorporation of the albuminous, proteinaceous and watery portions of the egg with the sugar, to insure against the future disintegration of the mass and recrystallization of the sugar. The mass may undergo the mixing while being subjected to the heating process as above provided, or thereafter, depending upon the provisions made, but in no case must the egg be heat treated previous to the addition of the sugar, as to do so at this stage would only permit of heat treatment at a temperature below that required normally for the coagulation of egg albumen, or a temperature below that necessary to the destruction of bacteria, while, on the other hand, if the heat treatment be delayed until during or after the addition of the sugar, it will be found that the sugar has served to increase the resistance of the egg albumen to coagulation by as much as, approximately, 10 degrees Reaumur, an increase in temperature sufficiently high to insure the necessary sterilization of the product.

Having thus described my invention, I claim, and desire to secure by Letters Patent:

The method of preserving the whites of eggs, consisting in taking by weight equal parts of the whites of eggs and sugar and mixing this composition under a temperature of 50 degrees Reaumur until smooth and of the consistency of syrup.

In testimony whereof, I hereby affix my signature this 19th day of February, 1929.

JOSEPH FOUSEK.